Jan. 29, 1924.
H. S. BEATON
1,482,064
WEED CUTTING DEVICE
Filed Aug. 18, 1922  2 Sheets-Sheet 1
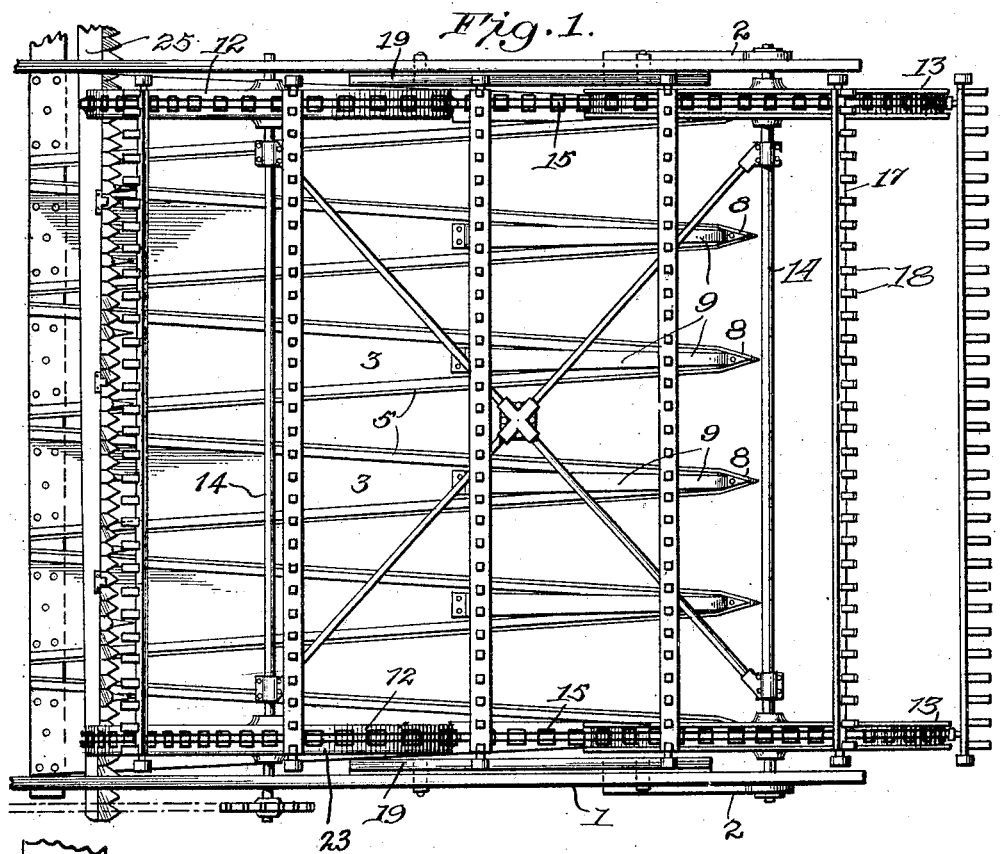
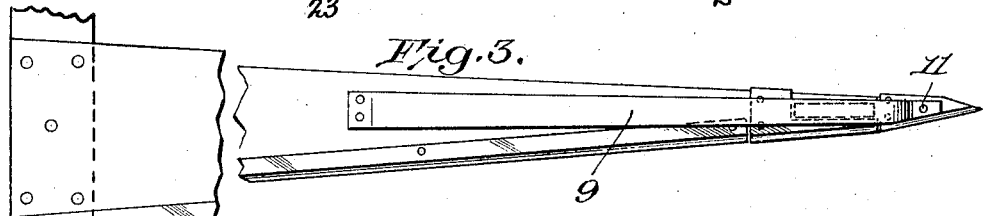
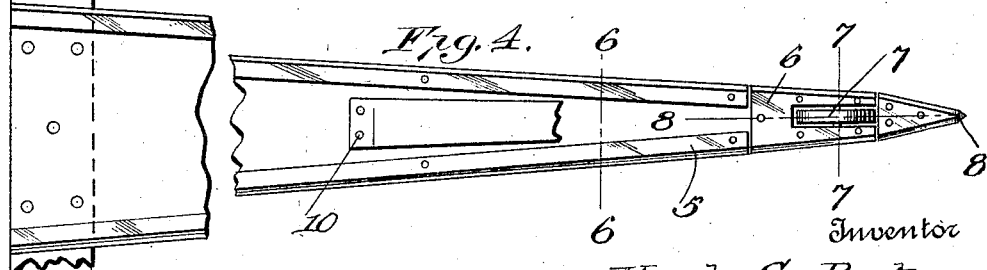
Inventor
Hugh S. Beaton
William C. Suntor
Attorneys Jan. 29, 1924.
H. S. BEATON
WEED CUTTING DEVICE
Filed Aug. 18, 1922
1,482,064
2 Sheets-Sheet 2
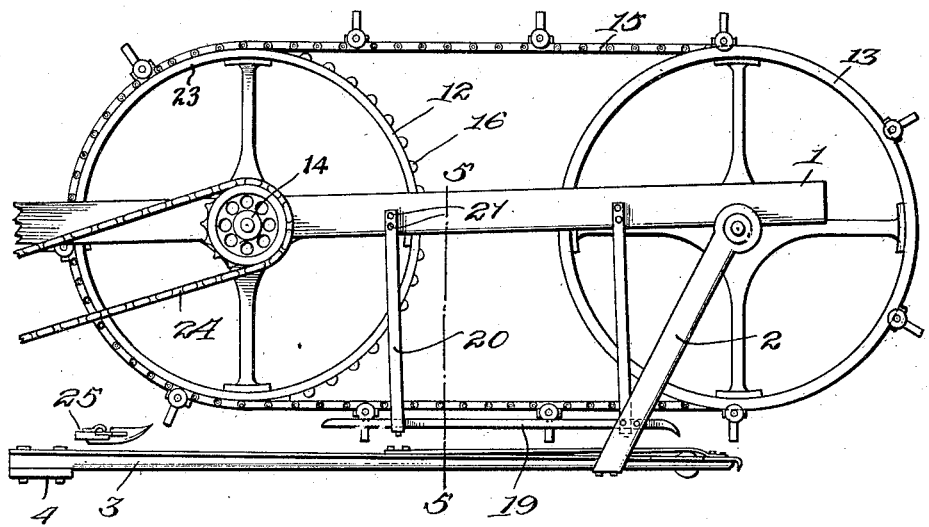
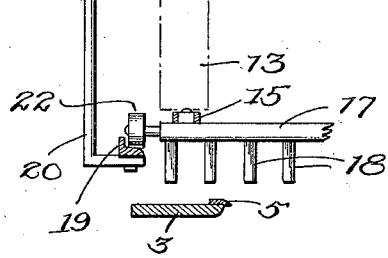
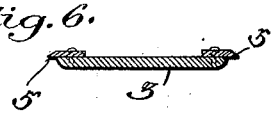
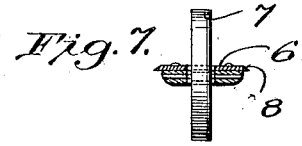
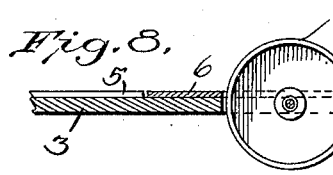
Inventor
Hugh S. Beaton
William C. Linton
Attorneys Patented Jan. 29, 1924.

1,482,064

UNITED STATES PATENT OFFICE.

HUGH STEPHEN BEATON, OF OLYMPIA, WASHINGTON.

WEED-CUTTING DEVICE.

Application filed August 18, 1922. Serial No. 582,794.

*To all whom it may concern:*

Be it known that I, HUGH S. BEATON, a citizen of the United States of America, residing at Olympia, in the county of Thurston and State of Washington, have invented certain new and useful Improvements in Weed-Cutting Devices; and I do hereby declare that the following is a full, clear, concise, and exact description of the invention, such as will enable others skilled in the art to which it appertains to make and use the same.

This invention relates to improvements in weed cutting devices, having for an object to provide a weed cutting attachment for harvesting machines, such as binders, headers, mowers, et cetera, whereby various weed growths, especially that weed commonly known as the Russian thistle, will be positively severed with passage of a machine thereover, means being provided for causing the same to be fully engaged with the cutting elements provided on the device therefor and to prevent the same from bending or flexing upon themselves to positions whereat they will escape such cutting elements as is the case when attempts are made to cut them with the knife or reciprocating blades employed upon the now prevalent designs of machines of the above character.

It is likewise an object of the invention to provide novelly arranged cutting blades upon the tapered gathering fingers of the attachment, which with engagement of the weeds therewith, will effectually sever the same.

Yet another object of the invention is to provide bracing means adapted to automatically engage and direct the weeds to be cut into engagement with the cutting blades upon the gathering fingers during movement of a machine equipped therewith over a field or other surface.

Other objects will be in part obvious and in part pointed out hereinafter.

In order that the invention and its mode of operation may be readily understood by persons skilled in the art, I have in the accompanying illustrative drawings and in the detailed following description based thereon, set out one possible embodiment of the same.

In these drawings:

Figure 1 is a top plan view of the improved weed cutting attachment showing it connected or attached to a harvesting machine adjacent the reciprocal mower knife thereof;

Figure 2 is a side elevation of the same;

Figure 3 is a top plan view of one of the outside or outer gathering fingers of the attachment showing the arrangement of one cutting blade thereon;

Figure 4 is a similar view showing one of the intermediate gathering fingers with the double arrangement of cutting blades adjacent its marginal portions;

Figure 5 is a fragmentary vertical transverse section taken on the line 5—5 of Figure 2;

Figure 6 is a detail in vertical transverse section taken on the line 6—6 of Figure 4;

Figure 7 is a similar section taken on the line 7—7 of Figure 4; and,

Figure 8 is a detail in vertical longitudinal section taken on the line 8—8 of Figure 4.

Having more particular reference to the drawings, in connection with which like characters of reference will designate corresponding parts throughout, it may be stated at the outset that the improved weed cutting device is particularly adapted for use in connection with harvesting machines, such for example, as a binder, header, mower, et cetera, being adapted to be arranged adjacent the mower knife of such a machine and securely connected to the machine in order that such matter as passing through the gathering fingers of the weeding attachment, hereinafter more fully described, may be directed into engagement with the mower blade. To this end, the invention may be stated to comprise spaced side supporting members 1 having their rearward portions provided with suitable attaching means, not shown, whereby fixed connection may be had with an adjacent portion of the harvesting machine body or frame, as the case may be. Dependent arms 2 are rigidly connected to the outer portion of the oppositely disposed side members 1 and have connection, at their lower ends, with the outermost gathering fingers designated by the numeral 3.

These gathering fingers comprise outwardly tapering bars or strips arranged longitudinally and in spaced relation, having their rearward or enlarged portions connected to a cross bar 4 whereby they will be united. If desired, suitable connection as between the cross bar 4 and the frame of the harvesting machine, not shown, may be made with a view towards stabilizing the arrangement of the longitudinally disposed gathering fingers 3 with relation to the former.

Cutting elements or blades generally indicated by the numeral 5 are provided and as will be noted, consist of strips having their outer marginal portions sharpened and being formed of lengths approximately corresponding to the lengths of the various gathering fingers 3, the outermost gathering fingers having one of the blades 5 secured adjacent their inner sides or marginal portions and extending laterally therefrom as shown in the Figure 5, while the intermediate gathering fingers 3 are provided with blades 5 adjacent their opposite sides or marginal portions, as shown in the Figure 6, portions of these blades extending beyond said opposite sides of the fingers for an obvious purpose. Metal frames or carriages 6 are arranged adjacent and connected to the forward extremities of the various gathering fingers 3 and as will be noted, are provided with bifurcated portions adapted to receive rollers or small wheels 7 therein, the axles of said rollers or wheels being journalled in suitable bearings formed in the opposite portions of the bifurcated sides of said carriages. Thus, means are provided for effectually supporting the forward ends of the gathering fingers 3 in spaced relation from a field or other surface over which the device is moved. Triangularly shaped teeth generally indicated by the numeral 8 are arranged adjacent and secured to the forward or free extremities of the various frames 6 and as will be appreciated, serve as effectual guide means for dividing and guiding the weeds to be cut upon the blades 5 of the gathering fingers into engagement therewith. In this connection, it is to be noted that the opposite sides of the triangularly shaped teeth 8 and the corresponding sides of the frames 6 are sharpened, thus providing knife edges which when engaged with weeds passing therealong, will function to sever the same. To prevent the tangling of weeds or other growths with the wheels or rollers 7, I may and preferably do provide each of the gathering fingers 3 with guard strips, generally indicated by the numeral 9, securing the rearward extremities of the strips to adjacent portions of the upper sides of said fingers and indicated at 10, while the forward extremities thereof are bent downwardly in the manner shown in the Figure 2 and secured, as at 11, to adjacent portions of the upper sides of the respective teeth 8 of said fingers. Because of the arrangement of the guards 9 over the tread portions of the wheels 7, it will be understood that the weeds or other growths falling over onto the fingers during movement of the same thereby will be prevented from becoming entangled therewith with the resultant danger of breaking or otherwise damaging the parts so engaged.

With a view towards providing means for keeping the weeds upright during their movement between the gathering fingers 3 whereby they will be effectually engaged with the cutting blades 5, wheels 12 and 13 are rotatably mounted upon transversely disposed rods 14 mounted in suitable bearings in the oppositely disposed side members 1 and are adapted to receive thereabout endless sprocket chains 15; the wheel 12 being provided with sprocket teeth 16 disposed about its peripheral surface for an obvious purpose. Bars generally indicated by the numeral 17 are disposed transversely of the gathering fingers 3 and are fixedly connected at their opposite ends to the oppositely disposed sprocket chains 15 travelling about the wheels 12 and 13 in equi-distant relation thereabout. These bars 17 are provided with equi-distant spaced teeth 18, thus causing the same to effectually function as rakes when they are moved rearwardly over the gathering fingers 3, whereby the weeds passing between said gathering fingers will be retained in upright positions and in consequence, effectually engaged with the cutting blades 5 arranged adjacent the marginal portions of said gathering fingers. To support the lower sides of the oppositely disposed sprocket chains, guide bars, preferably formed of angle metal and indicated by the numeral 19 are arranged adjacent the under sides of each of said chains, being supported upon hangers 20 which are secured at their upper ends to portions of the oppositely disposed side members as indicated at 21. Rollers 22 are carried upon stub axle extensions formed on the opposite ends of the rake bars 17 and as shown in the Figure 5, are adapted to engage with the tracks afforded by the angle guide bars 19 in order that the particular bars engaging therewith will be properly supported in spaced relation to the outer sides of the gathering teeth 3 and in consequence, direct the weeds into engagement with the cutting blades 5, during the rearward travel of the bars and their teeth over the same.

The rearwardly disposed shaft 14 is provided with an extension on end thereof upon which a sprocket wheel 23 is fixedly mounted, said sprocket wheel receiving a chain 24 thereabout which, in turn, is extended into engagement with a sprocket wheel, not shown, mounted upon the harvesting machine and having connection with the power transmission gearing thereof. Thus, rotary motion will be transmitted to the wheels 12 and 13 for causing movement of their respective sprocket chains 15 and the respective rake bars in the proper direction.

In operation of the improved weed cutting attachment, during movement of the gathering fingers over a field or other surface, such weeds as are encountered in the path of travel of the gathering fingers will be caused to move between the same whereupon the upper portion thereof will be engaged by the teeth 18 on the various rearwardly moving rake bars 17 carried on the oppositely disposed sprocket chains 15. By this engagement of the teeth 18 and their bars 17 with the weeds, and the latter will be caused to move into engagement and along the sharpened edges of the teeth 8 and frames 6 as well as the various cutting blades 5, thus severing the same from their roots. The grain or grass being cut by the mower blade of the machine, which is herein designated by the numeral 25 will be unobstructed during its passage into engagement with such blade, whereby the harvesting machine will efficiently perform its function. Because, however, of the spongy, pliable and tough nature of the weed growths, it should be noted that the mower blade 25 will be ineffective for cutting the same, since when engaged between the guide teeth of the blade, the weedy growth will move to such positions as will prevent complete severing of the same from their roots. This is particularly true of that weed commonly known as the Russian thistle, which is of an exceedingly spongy and pliable nature. By reason of the rearwardly moving rake bars 17 with their teeth 18 over the cutting blade carrying gathering fingers 3, however, these weed growths will be retained in upright or substantially upright positions and will be positively engaged with the cutting edges on said fingers, in order that they will be effectually severed and fall to the ground before the mower blade 25 reaches the same.

Manifestly, the construction shown is capable of considerable modification and such modification as is within the scope of my claims, I consider within the spirit of my invention.

I claim:

1. An attachment of the character described comprising a series of relatively spaced longitudinal outwardly tapering gathering fingers, cutting blades secured to the sides of said fingers and extending laterally from their marginal portions, teeth secured to the forward ends of each of said gathering fingers having cutting edges formed on their opposite sides corresponding to the arrangement of the cutting blades and aligning therewith and means supported above said fingers and movable rearwardly over the same for directing matter into engagement with said blades.

2. An attachment of the character described comprising a series of relatively spaced longitudinal outwardly tapering gathering fingers, cutting blades secured to the opposite sides of certain of said fingers and to the inner sides of certain others of said fingers, said cutting blades extending laterally from the adjacent marginal portions of the fingers, teeth secured to the forward extremities of said gathering fingers having their marginal portions formed with cutting edges corresponding to the arrangement of the cutting blades on their respective gathering fingers, and raking means supported above said fingers and movable rearwardly over the same for directing matter into engagement with said cutting edges and blades.

3. An attachment of the character described comprising a series of relatively spaced longitudinal outwardly tapering gathering fingers, blades secured to the upper sides of certain of said fingers and extending laterally from their opposite marginal portions, other blades secured to the upper sides of certain others of said fingers adjacent to and extending laterally from their inner marginal portions, wheeled carriages secured to the forward ends of each of said gathering fingers having cutting edges formed upon their opposite sides corresponding to the arrangement of the cutting blades on their respective gathering fingers, teeth secured to the forward ends of each of said wheeled carriages having cutting edges on their marginal portions corresponding to the arrangement of the cutting edges on their respective carriages, and raking means supported above and movable rearwardly over said gathering fingers, wheeled carriages and teeth for directing matter into engagement with the cutting edges and blades.

4. An attachment of the character described comprising a series of relatively spaced longitudinal outwardly tapering gathering fingers, cutting blades secured adjacent the opposite sides of certain of said gathering fingers, other cutting blades secured adjacent the inner sides of the remaining gathering fingers, said cutting blades extending laterally from their adjacent marginal portions of said fingers, outwardly tapered wheeled carriages secured to the forward ends of each of said gathering fingers having cutting edges formed upon their opposite sides corresponding to and aligning with the cutting edges of said blades, teeth secured to the forward ends of said carriages having cutting edges thereon corresponding to the arrangement of the cutting edges on their respective carriages, guard strips secured to the upper sides of said gathering fingers and extending forwardly over the wheels on said carriages and secured to adjacent portions of the teeth thereon, oppositely disposed pairs of wheels rotatably supported above said gathering fingers, sprocket chains engaged about and movable over said wheels, transversely disposed bars connected at their opposite ends to said sprocket chains having a series of spaced teeth thereon adapted to be moved rearwardly over the gathering fingers, guide bars supported above said gathering fingers adapted to receive and support the opposite extremities of said bars, at times, and means for transmitting rotary motion to said wheels.

In witness whereof I have hereunto set my hand.

HUGH STEPHEN BEATON.